Figure 1:
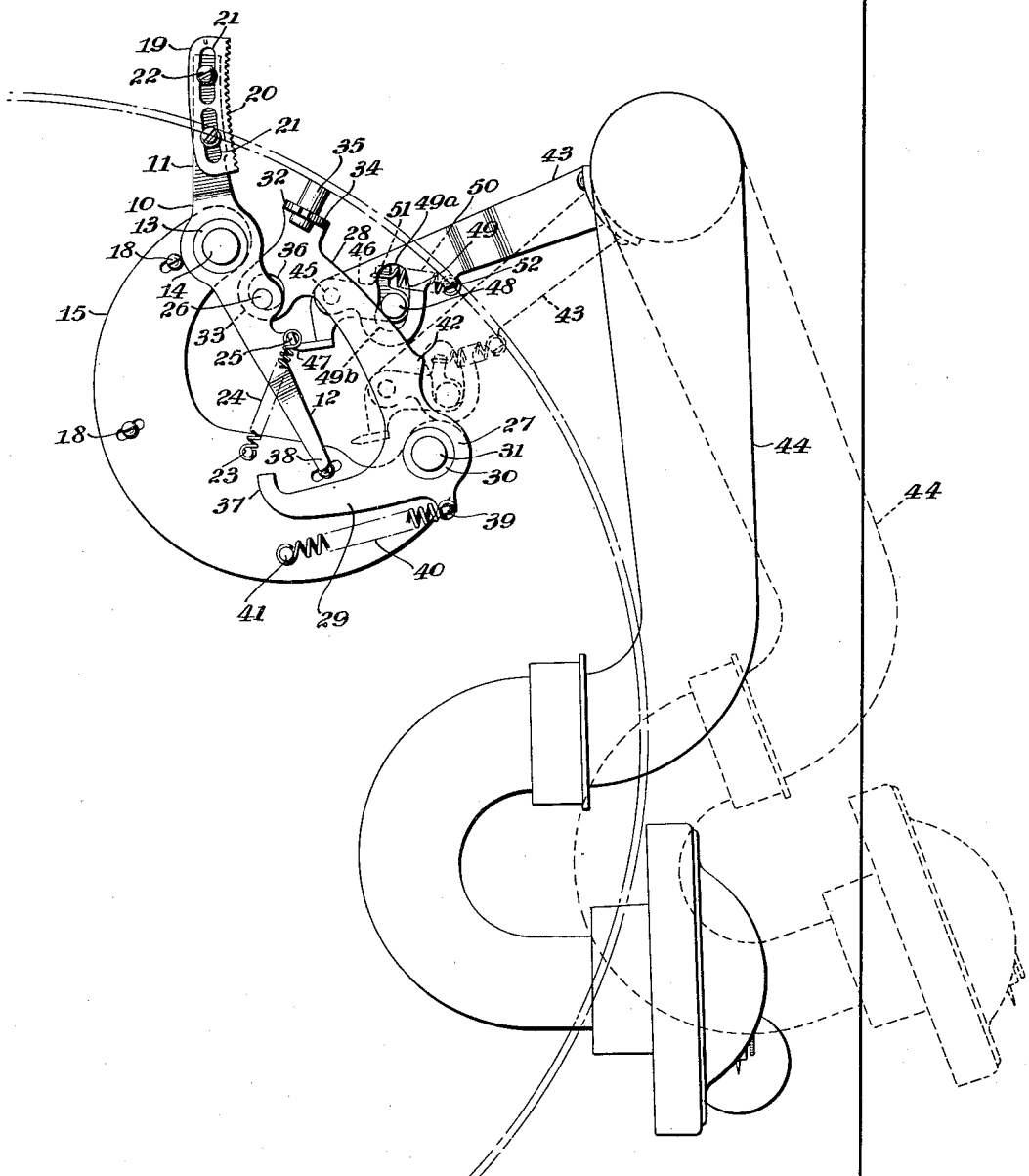

May 1, 1934.  B. R. CARSON  1,956,548
AUTOMATIC BRAKE FOR PHONOGRAPHS
Filed June 30, 1932  2 Sheets-Sheet 2

INVENTOR:
Benjamin R. Carson,
BY Goldsborough
HIS ATTORNEY

Patented May 1, 1934

1,956,548

UNITED STATES PATENT OFFICE 1,956,548

AUTOMATIC BRAKE FOR PHONOGRAPHS

Benjamin R. Carson, Camden, N. J., assignor to Radio Corporation of America, a corporation of Delaware Application June 30, 1932, Serial No. 620,193

9 Claims. (Cl. 192—118)

My invention relates to stopping and starting devices for phonographs, and constitutes an improvement over prior art devices of the type exemplified by the patent to H. L. T. Buckle. No. 1,685,872, issued on October 2, 1928, and assigned to Radio Corporation of America, for Automatic brakes.

More particularly, my invention relates to automatic brakes of the type which embodies a rotatable braking member and a detent member adapted to engage the braking member to hold it in the "off" position and to be moved, by a member moved by or in conjunction with the sound translating device, to permit the braking member to move into the "on" position.

In devices of the kind disclosed in the above noted patent, certain disadvantages are present. For example, when it is desired to remove a record from the turntable, it is customary to first move the sound translating device to one side of the turntable. In doing so, the natural tendency is to move the said device to the limit of its outward movement with the result that the turntable is released for rotation. When this occurs, it is necessary to either thread another record on the turntable center pin while the turntable is rotating, which is exceedingly inconvenient, or to hold the turntable against rotation by hand during the positioning of another record thereon. On the other hand, if the sound translating device is not moved to the limit of its outward movement but only slightly beyond the outer edge of the turntable, so that the braking device will be maintained in "on" position, it is somewhat inconvenient to remove a record from the turntable or to place another record thereon by reason of the fact that the sound translating device is somewhat of an obstruction when in such position.

In accordance with my invention, I provide a brake mechanism for phonographs wherein a brake releasing device, operable by or in conjunction with a sound translating device, causes the brake to be moved to "on" position by movement of the sound translating device in one direction only, and causes the braking member to move to "off" position by movement of the sound translating device only in the opposite direction. The arrangement is such that the brake is moved to "on" position when the sound translating device is moved from a position over the turntable to a position to one side thereof. Thus, the brake may be moved to "on" position by movement of the sound translating device away from the turntable, and it will remain in "on" position until such time as the sound translating device is moved back toward the turntable. By giving the sound translating device a substantial latitude of movement beyond the turntable, it is possible to move it entirely clear of the turntable whereby a new record may be easily and conveniently deposited on the turntable while the brake is still in "on" position. I am thus able to attain the primary object of my invention, namely, to provide a brake mechanism for phonographs which will not be subject to the disadvantages present in phonograph brake mechanisms heretofore known.

A further object of my invention is to provide an automatic brake for phonographs in which the braking member is moved from the "on" to the "off" position, and vice versa, alternately by successive movements of the sound translating device in opposite directions.

Another object of my invention is to provide an automatic brake for phonographs which will remain in "on" position after the sound translating device has been moved to the limit of its movement beyond the periphery of the turntable.

A further object of my invention is to provide an automatic brake for phonographs which will remain in "on" position after the sound translating device has been moved to the limit of its movement beyond the periphery of the turntable and which may, thereafter, be restored to "off" position upon subsequent movement of the said translating device toward the turntable.

Another object of my invention is to provide automatic brake releasing mechanism which is actuated only after a definite cycle of movements of a control member, moved by or in conjunction with a sound translating device, takes place, so that actuation of said mechanism cannot be effected upon movement of said control member merely within said cycle of movements.

A further object of my invention is to provide brake releasing mechanism for phonographs which is adapted to be set for subsequent operation by movement of the sound translating device to the limit of its movement in one direction, and actuated upon movement of said translating device in the opposite direction.

The novel features that I consider characteristic of my invention are set forth with particularity in the appended claims. The invention itself, however, both as to its organization and its method of operation, together with additional objects and advantages thereof, will best be understood from the following description of a specific embodiment thereof, when read in connection with the accompanying drawings, in which Fig. 1 is a top plan view of my improved brake mechanism with a portion of the turntable shown in dot and dash lines and the sound translating device shown in two different positions.

Figure 2:
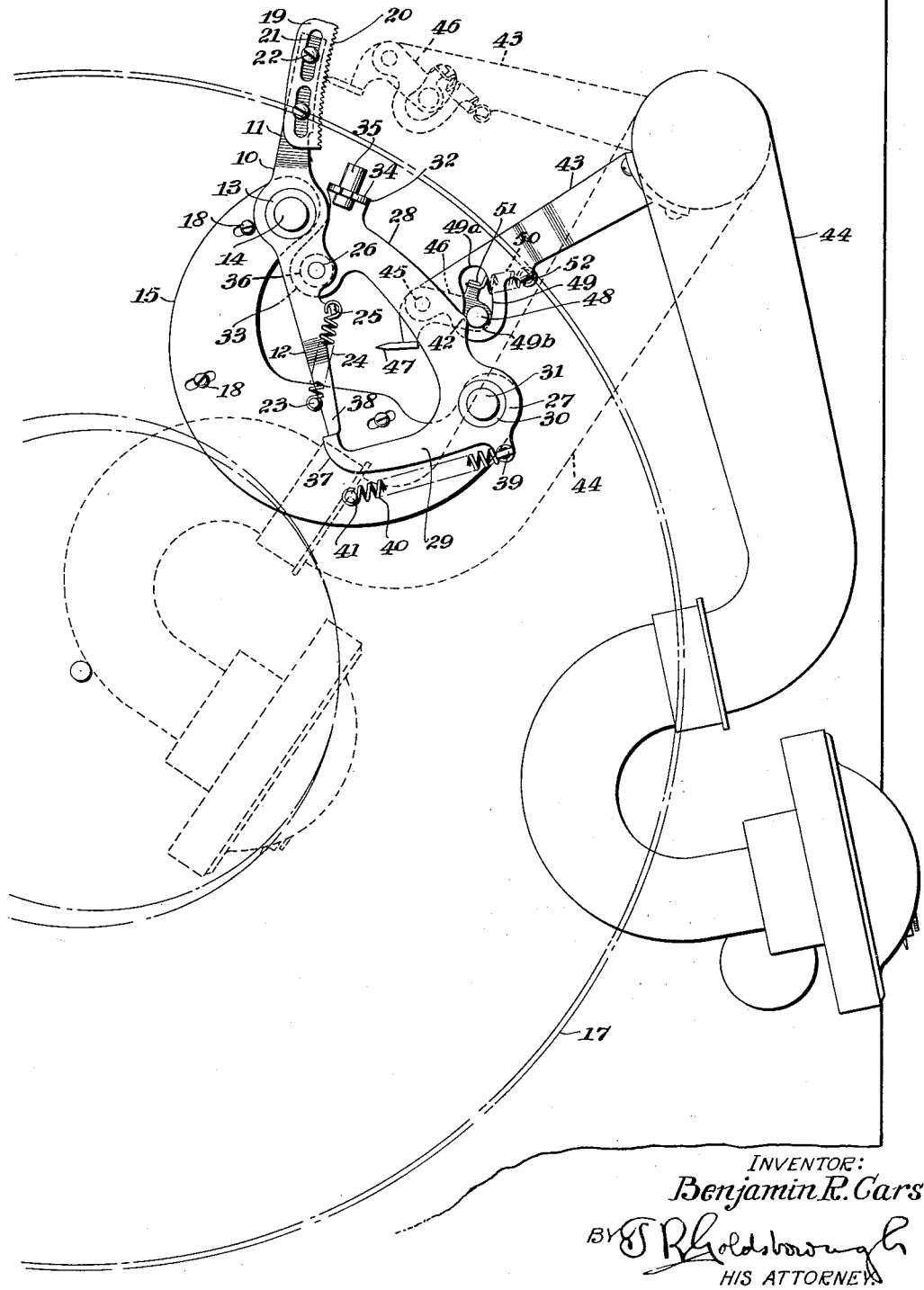

Fig. 2 is a similar view of my improved brake mechanism with a portion of the turntable shown in dot and dash lines and the sound translating device in two other positions.

Referring to the drawings, I have illustrated, by way of example, a phonograph provided with an automatic brake of the kind which is released for movement to "on" position by imparting to the sound translating device, after a period of sound reproduction, a movement in the reverse direction to that in which it is moved during sound reproduction. My improved braking mechanism comprises a detent member 10 which is staked or otherwise secured, at a point intermedite its end portions 11 and 12, to a bearing sleeve 13 whereby the said member is adapted to be rotated about a pivot pin 14 upstanding from a substantially crescent shape base plate 15. The base plate 15 is ordinarily secured, for example, to a motor board 16 in a position under the turntable 17 by means of a plurality of screws 18 or the like.

An arcuate plate 19 having a series of serrations or teeth 20 formed in one edge thereof is adjustably secured to the end portion 11 of the member 10 by means of slots 21 formed in the plate 19 and the machine screws 22 which are threaded into the member 10. The end portion 11 of the member 10 is preferably offset in a plane below that occupied by the remaining portion of the member 10, so that the plate 19 will lie in a plane occupied by a pawl 46 hereinafter described.

A pin 23 upstanding from the base plate 15 serves as an abutment for the opposite end portion 12 of the member 10 and also as an anchorage for one end of a coil spring 24. The other end of the spring 24 is attached to an upstanding ear 25 formed on one edge of the detent member 10, whereby the member 10 is constantly urged toward the pin 23 in a clockwise direction.

The end portion 12 of the detent member 10 is further provided with a pin 26 which cooperates with the arm 28 of a two-armed brake lever 27, hereinafter described, and depends from the end portion 12 at a point adjacent to the pivot pin 14 on which the detent member 10 is rotatably mounted.

The brake lever 27, comprising two angularly disposed arms 28 and 29, is staked or otherwise secured to a bearing sleeve 30 at a point substantially intermediate its ends, whereby the brake lever 27 is adapted to be rotated about a pivot pin 31 also upstanding from the base plate 15, the lever 27 being in cooperative relation with the detent member 10.

The free end portion of the arm 28 of the brake lever 27 comprises two oppositely disposed ends 32 and 33. The end 32 terminates in an upstanding ear 34 suitably slotted for the reception of a leather brake pad 35 which is clamped between the divided portions of the ear 34. The opposite end 33 is provided with an opening 36 into which extends the depending pin 26 carried by the end portion 12 of the detent member 10 for a purpose hereinafter described.

The other arm 29 of the brake lever 27 is formed substantially at right angles to the arm 28 with its free end 37 bent to extend toward the upstanding pin 23. The bent end 37 of the arm 29 is adapted to cooperate with the free end 38 of the detent member 10 whereby the brake lever 27 may be detained or latched in an inoperative or "off" position when the free detent end 38 and the bent end 37 are in abutting engagement.

An upstanding ear 39 is formed on one edge of the brake lever 27 adjacent the bearing sleeve 30 for attachment thereto of one end of a coiled spring 40. The opposite end of the spring 40 is anchored to an upstanding pin 41 which is carried by the base plate 15 whereby the brake lever 27 is constantly urged in a clockwise direction. Thus, the brake pad 35 is moved into engagement with the turntable 17 when the free end 38 of the detent member 10 is released from engagement with the bent free end 37 of the brake lever 27.

A cam-like projection 42 is formed on one edge of the brake lever 27 intermediate the brake pad 35 and the pivot pin 31 whereby the brake lever 27 is restored to an inoperative or "off" position by brake actuating and releasing means now to be described.

The brake actuating and releasing means which cooperates with the toothed plate 19 and the cam-like projection 42 comprises a radially extending arm 43 which is secured to the tone arm 44, for example, for movement therewith, as by means of suitable rivets, screws or the like.

Pivoted to the underside of the free end of the arm 43 by means of a pivot pin 45 is a pawl 46 having a vertically disposed knife edge 47 formed on the outer end thereof and adapted to engage with the teeth 20 of the plate 19. The other end of the pawl 46 is provided with an upstanding pin 48 which projects through an arcuate slot 49 formed in the arm 43 on a radius with respect to the center of the pivot pin 45 so that the pin 48 will follow the contour of the slot 49 as the pawl 46 swings about the pivot pin 45.

The pawl 46 is normally urged in a clockwise direction by means of a spring 50 having one end thereof attached to the pawl 46, as indicated at 51, and the other end attached to a depending ear 52 which is formed on one edge of the arm 43.

*Operation*

Assume that the tone arm 44 has been moved to the position shown in solid lines in Fig. 1 after a period of sound reproduction. In this position of the tone arm 44, the brake lever 27 is in "on" position. The tone arm 44 is now moved to its extreme outer position, as indicated by the dotted lines in Fig. 1, so that a record may be conveniently placed on the turntable. In this position of the tone arm 44, the brake lever 27 remains in the "on" position.

In moving the tone arm 44 from the full line position to the dotted line position (Fig. 1), the pin 48 is moved by the cam-like projection 42, against the action of the pawl spring 50, until the pin 48 approaches the end 49ᵃ of the slot 49, whereupon the pin 48 is free to pass the projection 42 and return to the other end 49ᵇ normally occupied thereby, as clearly shown by the dotted line position in Fig. 1.

Assuming that another record has been placed on the turntable, the tone arm 44 is now moved from its extreme outer position, indicated in dotted lines in Fig. 1, toward the turntable, or to the full line position shown in Fig. 2. In moving the tone arm 44 to this position, the pin 48 engages the opposite side of the cam-like projection 42 and, since the pin 48 now occupies the end 49ᵇ of the arcuate slot 49, the brake lever 27 will be moved by the pin 48 in a counter-clockwise direction into latched engagement with the detent member 10, whereby the brake lever 27 is restored to and locked in "off" position.

During the above described restoring movement of the brake lever 27 by the cooperative engagement of the cam projection 42 and the pin 48, the detent member 10 is moved in a clockwise direction by the action of the spring 24 until the end portion 12 thereof is in abutment with the pin 23. However, since the above movement is completed before the brake lever 27 has reached the limit of its counter-clockwise movement in response to the pin 48, continued movement of the brake lever 27 relatively to the detent member 10 is necessary in order that the pin 48 may pass the cam-like projection 42 when the tone arm 44 is moved toward the turntable. To permit movement of the brake lever 27 relatively to the detent member 10, the opening 36, formed in the arm 28 of the said brake lever, is made considerably larger than the diameter of the pin 26 so as to provide the necessary lost motion between the detent member and brake lever.

When the knife edge 47 of the pawl 46 is again brought into engagement with the toothed edge of the plate 19 during a period of sound reproduction and the detent member 10 is subsequently tripped by a reverse movement of the tone arm 43 to release the brake lever 27, the brake lever will be moved in a counter-clockwise direction. In its clockwise movement, the lever 27 will impart a counter-clockwise movement to the detent member 10 by virtue of the engagement of the depending pin 26 with the edge of the opening 36, whereby the plate 19 is moved out of the path of movement of the pawl 46 upon movement of the tone arm 44 to a position beyond the periphery of the turntable.

Although I have shown and described one specific embodiment of my invention, I am fully aware that many modifications thereof are possible. My invention, therefore, is not to be restricted except insofar as is necessitated by the prior art and by the spirit of the appended claims.

I claim as my invention:

1. In a phonograph, the combination of a movable element having forward and reverse movements, a rotatable element, a brake for said rotatable element, and means carried by said movable element and associated with said brake, said means being operable to apply said brake upon a reverse movement of said movable element and to release said brake upon a forward movement of said movable element.

2. In a phonograph, the combination of a movable element having forward and reverse movements, a rotatable element, a brake for said rotatable element, means operable to apply said brake automatically when said movable element is given a reverse movement, means for maintaining said brake in applied position upon further reverse movement of said movable element, and means for releasing said brake upon movement of said movable element in the opposite direction.

3. In a phonograph, the combination of a record having an eccentric terminal groove adapted to impart a reverse movement to the sound translating device after a period of sound reproduction, a brake mechanism including a detent therefor, and means operable on said brake mechanism during a reverse movement of said device to release said mechanism for movement into "on" position and to restore said mechanism to "off" position upon manual movement of said device in a direction opposite to said reverse movement.

4. In a phonograph, the combination of a sound record provided with a spiral undulatory groove corresponding to sound waves, and a control groove communicating with and eccentric with respect to said spiral groove, a brake for controlling rotary movement of said record, and means actuated by said control groove for releasing said brake into "on" position, said means being actuable in a direction opposite to that in which it is actuated by said control groove to restore said brake to "off" position.

5. In a phonograph including a sound translating device, the combination of a sound record provided with a spiral undulatory groove corresponding to sound waves, and a control groove communicating with and eccentric with respect to said spiral groove, a brake for controlling rotary movement of said record, means carried by said device and movable therewith in response to said control groove for releasing said brake into "on" position, means associated with said first named means adapted to be positioned preparatory to restoring said brake to "off" position when said device is moved to a position beyond the edge of said record, and means carried by said brake adapted to coact with said last named means whereby said brake is restored to "off" position when said device is moved to record starting position.

6. In a phonograph including a sound translating device, the combination of a sound record provided with a spiral undulatory groove corresponding to sound waves, and a control groove communicating with and eccentric with respect to said spiral groove, a brake for controlling rotary movement of said record, and means actuated by said device in response to said control groove for releasing said brake into "on" position, means associated with said first named means adapted to be positioned preparatory to restoring said brake to "off" position upon movement of said device beyond the edge of said record, and cam means carried by said brake adapted to coact with said last named means whereby said brake is released when said device is subsequently moved to record starting position.

7. In a phonograph, the combination of an automatic brake comprising a movable brake member, means tending to move said brake member into "on" position, means for holding said brake member in "off" position, a sound translating device, means actuated by said device for releasing said brake member, and cooperative means carried by said brake member and said last named means for restoring said brake to "off" position upon movement of said device in the opposite direction.

8. In a phonograph, the combination of an automatic brake comprising a rotatable brake member and a detent member adapted to engage said brake member to hold it in the "off" position and to be moved to permit said brake member to move into the "on" position, a sound translating device, means carried by and movable with said device for releasing said detent to permit said brake member to move into the "on" position upon movement of said device in one direction, cam means carried by said brake member, and means carried by said first named means adapted to cooperate with said cam means for releasing said brake member upon movement of said device in a direction opposite to that causing release of said detent member.

9. In a phonograph, the combination of an automatic brake comprising a rotatable brake member, means tending to move said brake member into "on" position, means for holding said brake member in "off" position, a sound translating device, means movable in conjunction with said device for releasing said brake member upon movement of said device in one direction, means carried by said brake releasing means adapted for restoring said brake member to "off" position upon movement of said device in another direction, and cam means carried by said brake member adapted to be engaged by said last named means upon movement of said device in said other direction whereby said brake member is restored to "off" position.

BENJAMIN R. CARSON.